Patented May 29, 1951

2,554,681

UNITED STATES PATENT OFFICE 2,554,681

REDUCTION ACTIVATED PEROXYGEN CATALYZED SYNTHETIC RUBBER EMULSION POLYMERIZATIONS

Vadim C. Neklutin, Naugatuck, Conn., assignor to United States Rubber Company, New York, N. Y., a corporation of New Jersey No Drawing. Application September 8, 1949, Serial No. 114,690

2 Claims. (Cl. 260—84.1)

This invention relates to improvements in reduction activated peroxygen catalyzed synthetic rubber emulsion polymerizations, or so-called redox polymerizations.

Increasing the reaction rate of peroxygen catalyzed synthetic rubber emulsion polymerizations by including reducing agents with the peroxide catalyst is well known. Ferrous salts are commonly used as such reduction activators for the peroxygen catalyst. In order to obtain sufficiently high polymerization rates at low temperatures, present commercial recipes in GR-S (butadiene-styrene) polymerizations at 41° F. include a reduction activator comprising an aqueous solution of ferrous sulfate, sodium or potassium pyrophosphate, and a reducing sugar such as dextrose. In preparing such reduction activators an aqueous solution of the sodium or potassium pyrophosphate and reducing sugar must also be aged at a carefully regulated temperature to bring the reduction activator to the optimum activity.

I have found that the use of ferrous silicate in an iron activated peroxygen catalyst system for synthetic rubber emulsion polymerizations will give a more rapid polymerization than the conventional ferrous salts, such as ferrous sulfate or ferrous pyrophosphate. The ferrous silicate is readily formed by the addition of sodium silicate in the form of water glass to an aqueous solution of a ferrous salt, such as ferrous sulfate or ferrous chloride. It is not necesary to convert all the ferrous ion in the ferrous salt solution to ferrous silicate, and generally less than the metathetical amount of sodium silicate to react with the ferrous salt will be used. It is unnecessary to age the ferrous silicate and it may be loaded directly into the reactor or formed in situ in the reactor. It is recommended to add the ferrous sulfate and the sodium silicate to the main body of water for the emulsion of polymerizable monomers in the reactor, followed by the emulsifying agent, polymerizable monomers, peroxygen catalyst and regulator with the required amounts of water to make conventional emulsions or solutions, and any other materials in the charge formulation. The polymerization may be made to take place at any desirable temperature as from 0° F. to 150° F. (from 0° F. to 35° F. with the aid of an anti-freeze,—see Process Problems in Low-Temperature Emulsion Polymerization in Rubber Chem. & Tech., 22, 405–426). The catalyst may be the conventional peroxygen type catalyst, such as the persalts, e. g. alkali persulfates, alkali-perborates, alkali percarbonates; hydrogen peroxide; or organic peroxides, e. g. acyl peroxides such as diacetyl peroxide, dibenzoyl peroxide, acetyl benzoyl peroxide, and alkyl peroxides such as tertiary butyl hydroperoxide, and aralkyl peroxides such as cumene hydroperoxide ($\alpha,\alpha$-dimethylbenzyl hydroperoxide). Some of such peroxygen catalysts, as is known, are more effective than others in low temperature polymerizations. Conventional polymerization regulators such as primary and tertiary aliphatic mercaptans having 6 to 18 carbon atoms ($C_6$ to $C_{18}$), and aromatic mercaptans may be used to regulate the polymer chain length. The emulsifier for the polymerizable monomers may be a conventional soap or other surface-active emulsifying and dispersing agent. After the desired conversion of polymerizable monomers to synthetic rubber, the polymerization may be stopped by the addition of a conventional shortstopping agent such as hydroquinone, di- tert- butyl- hydroquinone, sodium sulfide, or dinitrochlorobenzene, and gaseous unreacted monomers vented off and liquid unreacted monomers stripped as by steam distillation. If desired, the synthetic rubber latex may be coagulated by salt and/or acid in known manner.

The polymerizable material for the preparation of the synthetic rubber latex may be one or more butadienes-1,3, for example, butadiene-1,3, 2-methyl-butadiene-1,3 (isoprene), 2,3-dimethyl-butadiene-1,3, piperylene, or a mixture of one or more such butadienes-1,3 with one or more other polymerizable compounds which are capable of forming rubbery copolymers with butadienes-1,3, for example, up to 70% by weight of such mixture of one or more compounds which contain a $CH_2=C<$ group where at least one of the disconnected valences is attached to an electro-negative group, that is, a group which substantially increases the electrical dissymmetry or polar character of the molecule, such group being other than H or $CH_3$. Examples of compounds which contain a $CH_2=C<$ group and are copolymerizable with butadiene-1,3 hydrocarbons are aryl olefins, such as styrene and vinyl naphthylene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride.

The invention is illustrated below by comparing a present day commercial GR-S polymerization at 41° F. with similar polymerizations using the ferrous silicate activator of the present invention. In butadiene-styrene emulsion polymerizations at 41° F., the polymerization is short-stopped at about 60% conversion, i. e. after polymerization of about 60% of the polymerizable monomers initially present in the emulsion to synthetic rubber, in order to obtain optimum properties in the polymer.

A current commercial low temperature GR-S synthetic rubber is produced by polymerizing at 41° F. an aqueous emulsion of the following formulation, all parts and percentages referred to herein being by weight:

| | Parts by weight |
|---|---|
| Butadiene-1,3 | 71.0 |
| Styrene | 29.0 |
| Disproportionated rosin soap (emulsifier) | 5.0 |
| Potassium hydroxide | 0.05 |
| Potassium chloride (viscosity reducer) | 0.2 |
| Tertiary alkyl mercaptans, Avg. $C_{12}$ (regulator) | 0.2 |
| Cumene hydroperoxide (catalyst) | 0.1 |
| Reduction activator | (see below) |
| Water | 180.0 |

The 180 parts of water in the above formulation include the water added to the reactor as such, and the water used to make up the various emulsions and solutions of the added reagents.

The reduction activator in the above formulation was prepared by dissolving 0.6 part anhydrous sodium pyrophosphate in 10–12 parts of water at 120° F., followed by the addition of 3.0 parts of dextrose. The resulting solution was heated immediately to 200° F., held for 5 minutes at 200° F. for aging, and then cooled. When the cooling solution reached 150° F., 0.1 part ferrous sulfate was added and the cooling continued to 80–90° F. With the sodium pyrophosphate and dextrose solution aged for 5 minutes at 200° F. as above according to specifications, 60% conversion is generally obtained at 41° F. in 17 to 19.5 hours. If the sodium pyrophosphate and sugar solution is not aged, the polymerization time to 60% conversion is about 22 hours. That the aging temperature and time is very critical is shown by an increase in polymerization time to about 22 hours (the same as without aging) when the sodium pyrophosphate and dextrose solution was aged for 8 minutes at 208° F.

As an example of the present invention, an emulsion of butadiene and styrene was polymerized according to the above formulation except that the reduction activator comprised ferrous silicate prepared from 0.25 part of $FeSO_4.7H_2O$ and 0.09 parts of $Na_2Si_4O_9$ (water glass) added to the reactor water at the beginning of the batch make-up. The batch was polymerized for 15 hours at 41° C. giving a 63% conversion. When from 0.15 to 0.4 parts of $FeSO_4.7H_2O$ was used as the reduction activator without addition of sodium silicate, there was substantially no conversion in 15 hours at 41° C.

In a series of runs in the above formulation using as reduction activators 0.25 part of $FeSO_4.7H_2O$, with varying amounts of $Na_2Si_4O_9$, polymerization for 10 hours at 41° C. gave 53% conversion with 0.1 part of $Na_2Si_4O_9$; 71% conversion with 0.2 part of $Na_2Si_4O_9$; 68% conversion with 0.25 part of $Na_2Si_4O_9$; 54% conversion with 0.3 part of $Na_2Si_4O_9$; 56% conversion with 0.35 part of $Na_2Si_4O_9$; and 51% conversion with 0.4 part of $Na_2Si_4O_9$.

In a further series of runs using ferrous silicate as the reduction activator in the above formulation, 12 hours polymerization at 41° C. gave a 56% conversion with 0.15 part of $FeSO_4.7H_2O$ and and 0.12 part of $Na_2Si_4O_9$; 62% conversion with 0.2 part of $FeSO_4.7H_2O$ and 0.16 part of $Na_2Si_4O_9$; and 68% conversion with 0.25 part of $FeSO_4.7H_2O$ and 0.2 part of $Na_2Si_4O_9$.

The ferrous silicate of the present invention may be used in other synthetic rubber polymerizations at various temperatures from below 0° F. to 150° F. and higher. As shown in the above illustrated examples, it is only necessary to use a small amount of ferrous silicate (or ferrous sulfate and sodium silicate), generally less than 1% by weight of the polymerizable monomers initially present in the emulsion. The amount of peroxygen catalyst is also generally less than 1% of the weight of the polymerizable monomers initially present in the emulsion.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The process which comprises polymerizing in an aqueous emulsion material selected from the group consisting of butadienes-1,3 and mixtures of butadienes-1,3 with compounds which contain a single $CH_2=C<$ group and are copolymerizable therewith, in the presence of a peroxygen catalyst, and ferrous silicate obtained by the interaction of ferrous sulfate and sodium silicate, the amount of said ferrous silicate being less than 1%.

2. The process which comprises polymerizing in aqueous emulsion a mixture of butadiene and styrene in the presence of a peroxygen catalyst, and ferrous silicate obtained by the interaction of ferrous sulfate and sodium silicate, the amount of said ferrous silicate being less than 1%.

VADIM C. NEKLUTIN.

REFERENCES CITED

The following references are of record in the file of this patent:

UNITED STATES PATENTS

| Number | Name | Date |
|---|---|---|
| 2,460,300 | Le Fevre et al. | Feb. 1, 1949 |